United States Patent [19]

Ostwald

[11] Patent Number: 4,835,634
[45] Date of Patent: May 30, 1989

[54] AUTOMATIC MAGNETIC TAPE CARTRIDGE STACK LOADER FOR TAPE DRIVE SYSTEMS

[75] Inventor: Timothy C. Ostwald, Louisville, Colo.

[73] Assignee: Storage Technology Corporation, Denver, Colo.

[21] Appl. No.: 159,689

[22] Filed: Feb. 24, 1988

[51] Int. Cl.$^4$ .................. G11B 15/68; B65G 57/00
[52] U.S. Cl. .................................. 360/92; 414/788.7
[58] Field of Search .................. 360/92, 98; 414/32, 414/92

[56] References Cited

U.S. PATENT DOCUMENTS

| | | | |
|---|---|---|---|
| 3,658,193 | 4/1972 | Gross | 414/32 |
| 3,758,122 | 9/1973 | Kawaharasaki | 414/32 X |
| 4,594,042 | 6/1986 | Hoffman | 360/92 X |

Primary Examiner—A. J. Heinz
Attorney, Agent, or Firm—Dorr, Carson, Sloan & Peterson

[57] ABSTRACT

The automatic magnetic tape cartridge stack loader apparatus includes a stack load slot for receiving a stack of magnetic tape cartridges. This slot is supported on the bottom by an indexing mechanism that translates the stack of magnetic tape cartridges in a downward direction so that the bottom most magnetic tape cartridge in the stack is in position in front of the tape drive access port, and supported by a load mechanism for insertion into the tape drive. A pair of stack grab plates, located on either side of the stack load slot concurrently operate to clamp the stack of magnetic tape cartridges, less the bottom most one, as the stack is translating in the downward direction. Once the bottom most magnetic tape cartridge is positioned on the load mechanism, the drop mechanism is operated to be repositioned under the stack of magnetic tape cartridges held by the stack grab plates. A tractor mechanism is then activated to load the magnetic tape cartridge from the load mechanism into the tape drive. When the magnetic tape cartridge is ejected from the tape drive, the tractor mechanism loads it onto the load mechanism where it is placed on to an elevator mechanism that supports a stack of ejected magnetic tape cartridges.

23 Claims, 7 Drawing Sheets

AUTOMATIC MAGNETIC TAPE CARTRIDGE STACK LOADER FOR TAPE DRIVE SYSTEMS

FIELD OF THE INVENTION

This invention relates to tape drive systems and in particular to an automatic magnetic tape cartridge stack loader apparatus that automatically loads and unloads a stack of magnetic tape cartridges into an associated tape drive.

PROBLEM It is a problem in tape drive systems to efficiently load and unload magnetic tape cartridges on a tape drive. In the past, an operator manually loaded and unloaded magnetic tape cartridges of the IBM 3480 type into a tape drive one magnetic tape cartridge at a time. The tape drive ejects the magnetic tape cartridge once the associated data processing system reads/writes data on the magnetic tape. The tape drive remains in an idle state until an operator retrieves the magnetic tape cartridge ejected by the tape drive and replaces it with a new magnetic tape cartridge. Such a manual operation is time consuming, inefficient and prone to error.

An improvement over this manual magnetic tape cartridge loading arrangement is the use of an automatic loader mechanism which typically consists of a plurality of individual magnetic tape cartridge storage slots, each of which holds a single 3480 type of magnetic tape cartridge. These individual magnetic tape cartridge storage slots are serially interconnected to form a vertically-oriented rack that holds a plurality of magnetic tape cartridges. An operator manually loads each magnetic tape cartridge, one at a time, into a corresponding individual magnetic tape cartridge storage slot of this automatic loader mechanism. The automatic loader mechanism then sequentially and automatically loads each of the magnetic tape cartridges into the tape drive associated with the automatic loader mechanism. This is accomplished by sequentially translating the magnetic tape cartridge "rack", one individual magnetic tape cartridge storage slot at a time, into position in front of the tape drive. The magnetic tape cartridge stored in the corresponding individual magnetic tape cartridge storage slot is then loaded into the tape drive.

Once the magnetic tape cartridge that has been loaded into the tape drive has been read or written by the tape drive, the tape drive ejects the magnetic tape cartridge. The automatic loader mechanism retrieves the ejected magnetic tape cartridge, places it into an ejected magnetic tape cartridge stack and automatically advances the individual magnetic tape cartridge rack to the next individual magnetic tape cartridge storage slot that contains an unused magnetic tape cartridge. The automatic loader mechanism then loads the magnetic tape cartridge stored in this individual magnetic tape cartridge storage slot into the tape drive for reading or writing of data thereon.

The difficulty with such an automatic loader mechanism is that it is time consuming for the operator to load the magnetic tape cartridges one at a time into corresponding individual magnetic tape cartridge storage slots in the automatic loader mechanism. In addition, the use of individual magnetic tape cartridge storage slots consumes a significant amount of space in the loader mechanism and thereby limits the number of magnetic tape cartridges that can be provided in an automatic loader mechanism. A further disadvantage is that this is a unidirectional mechanism, in that the automatic loader mechanism can only load magnetic tape cartridges into the tape drive mechanism and eject spent magnetic tape cartridges into the spent magnetic tape cartridge stack. Any magnetic tape cartridge that has been placed in the spent magnetic tape cartridge stack cannot be reinserted into the tape drive by the automatic loader mechanism.

SOLUTION

These problems are solved and a technical advance achieved in the field by the automatic magnetic tape cartridge stack loader apparatus. This automatic magnetic tape cartridge stack loader apparatus is mounted in front of an associated tape drive for loading and unloading magnetic tape cartridges in the associated tape drive. The automatic magnetic tape cartridge loader apparatus provides a stack loading feature that enables an operator to load an entire stack of magnetic tape cartridges into the apparatus rather than having to load individual magnetic tape cartridges into individual magnetic tape cartridge slots. The use of a stack loading mechanism provides greater efficiencies in several ways. The elimination of the individual magnetic tape cartridge slots permits the loading of more magnetic tape cartridges in a particular area than the use of the individual magnetic tape cartridge slots. In addition, the operator can load an entire stack of magnetic tape cartridges in a single operation rather than having to load individual magnetic tape cartridges into the apparatus. Further, there is a time savings by not having to wait for a cartridge to advance from an upper cartridge slot in the event that the lower slots are empty.

The automatic magnetic tape cartridge stack loader apparatus includes a stack load slot for receiving a stack of magnetic tape cartridges. This slot is supported on the bottom by a drop mechanism that translates the stack of magnetic tape cartridges in a downward direction so that the bottom most magnetic tape cartridge in the stack is in position in front of the access port of the associated tape drive, and supported by a load mechanism for insertion into the associated tape drive. A pair of stack grab plates, located on either side of the stack load slot operate to clamp the stack of magnetic tape cartridges, less the bottom most one, as the stack is translating downward. Once the bottom most magnetic tape cartridge is positioned on the load mechanism, the drop mechanism is operated to be repositioned under the remaining stack of magnetic tape cartridges held by the stack grab plates. A tractor mechanism is then activated to load the magnetic tape cartridge from the load mechanism into the associated tape drive. When the magnetic tape cartridge is ejected from the associated tape drive, the tractor mechanism loads the ejected magnetic tape cartridge onto the load mechanism where it is placed on to an elevator mechanism that supports a stack of ejected magnetic tape cartridges.

Another advantage of this mechanism is that a magnetic tape ejected from the associated tape drive can be reinserted in the associated tape drive since the stack loading mechanism is somewhat bidirectional in nature and can be reversed to move spent tape cartridges up from the ejected tape cartridge stack into the load position for the tape drive. These and other features and advantages of this invention will be disclosed in the description below.

DETAILED DESCRIPTION OF THE DRAWING

Tape drives function to read and write data on magnetic tapes in a data processing system. A popular format for the magnetic tape is the IBM 3480 type magnetic tape cartridge. This magnetic tape cartridge is a 5-¼ inch square housing that holds a single reel of ½ inch magnetic tape. The magnetic tape cartridge is inserted into the tape drive, which includes a mechanism to grab a leader block located of the end of the tape on the tape reel in the magnetic tape cartridge and transport the leader block and the attached magnetic tape through the tape drive mechanism to a take-up reel. The magnetic tape cartridge is typically manually loaded by an operator into a loading door or access port in the front of the tape drive. The tape drive includes a carriage mechanism which takes the magnetic tape cartridge that has been inserted through the loading door and positions the magnetic tape cartridge in the proper orientation for the tape drive mechanism to beginning threading the magnetic tape onto the take-up reel.

A difficulty with this arrangement is that the magnetic tape cartridges must be manually loaded into the tape drive and manually retrieved therefrom once the data is written or read on the magnetic tape. In order to reduce the amount of labor required to load and unload magnetic tape cartridges in the tape drive, a number of automatic tape cartridge loading mechanisms have been devised to load and unload a plurality of magnetic tape cartridges. A typical automatic tape cartridge loader illustrative of what is available is the IBM 3480 type automatic cartridge load mechanism. This mechanism consists of apparatus that contains a plurality of individual magnetic tape cartridge slots. The magnetic tape cartridges are manually loaded one at a time into these individual slots and the automatic loader mechanism sequentially positions each of the magnetic tape cartridges in front of the loading door of the tape drive and inserts the magnetic tape cartridge therein. Once the tape drive has completed the read or write operation on the magnetic tape cartridge, the spent magnetic tape cartridge is ejected from the tape drive into a cartridge eject stack which is located below the individual magnetic tape cartridge load apparatus. A problem with this apparatus is that the magnetic tape cartridges must still be individually loaded one at a time into their corresponding magnetic tape cartridge slots by a computer operator. These individual magnetic tape cartridge slots themselves occupy a certain amount of space so that the number of magnetic tape cartridges that can be placed in such a mechanism is limited.

The present automatic magnetic tape cartridge stack loader mechanism eliminates these problems by providing a magnetic tape cartridge loader apparatus that accepts an entire stack of magnetic tape cartridges without the use of individual magnetic tape cartridge slots. Thus, more magnetic tape cartridges can be inserted into this mechanism because there are no individual magnetic tape cartridge slot apparatus to occupy space in the loader apparatus.

Figure 1:
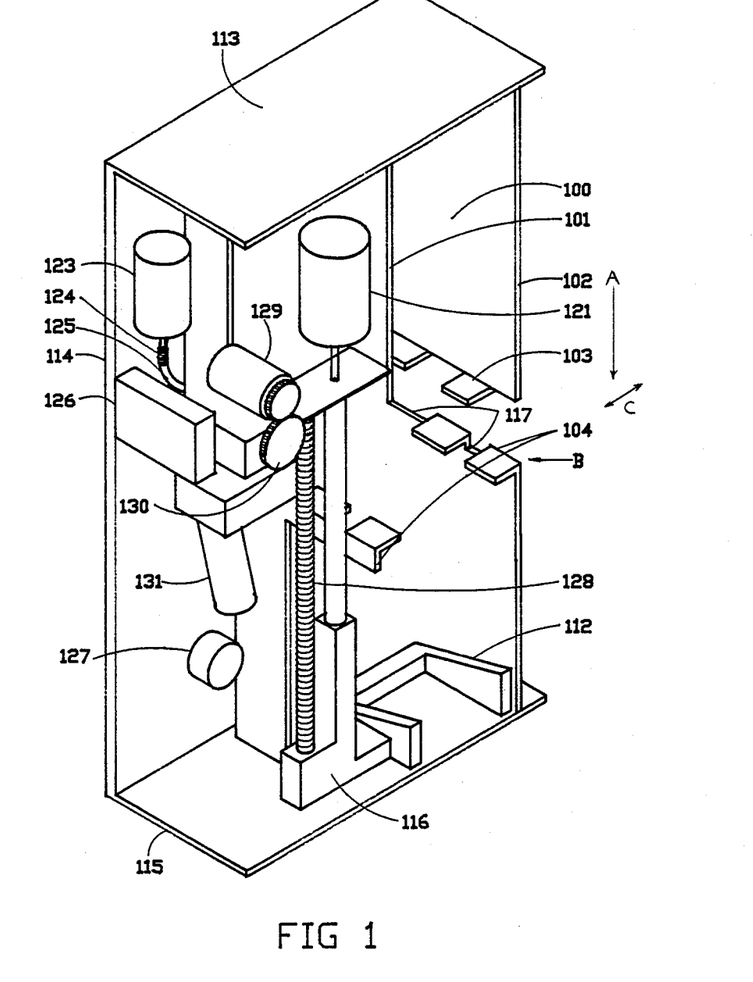
FIG. 1 illustrates the automatic magnetic tape cartridge stack loader for tape drive systems in cut away perspective view.
Figure 7:
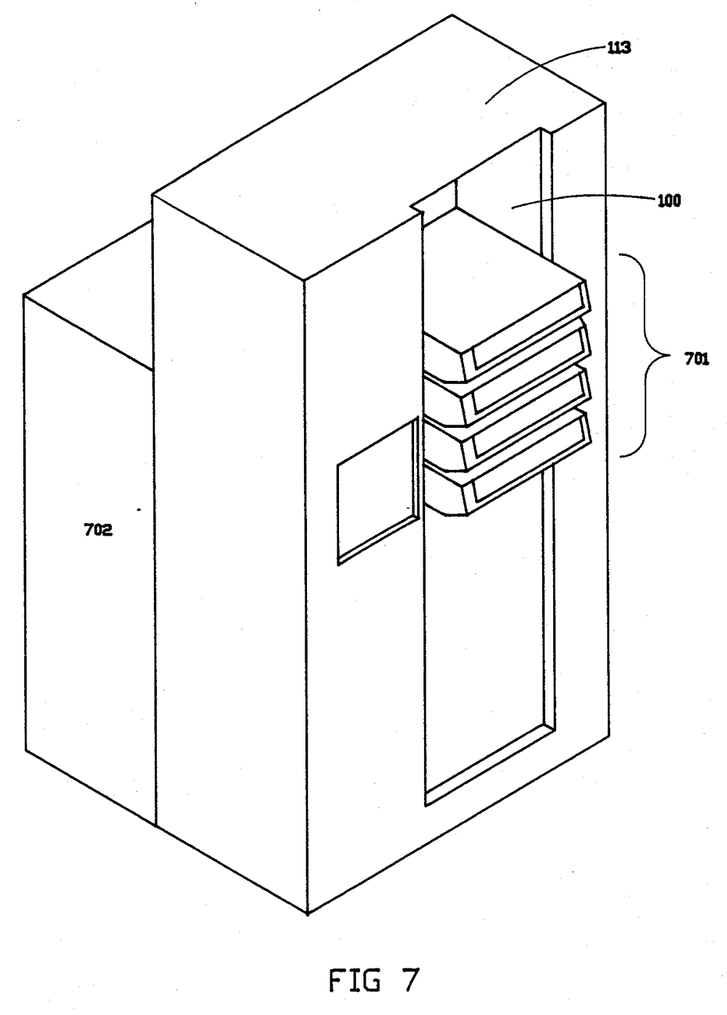
FIG. 7 illustrates the fully assembled housing for the automatic magnetic tape cartridge stack loader apparatus in perspective view.

The automatic magnetic tape cartridge stack loader apparatus is illustrated in perspective view in FIG. 1. This apparatus is contained in a housing that consists of a top plate 113, back plate 114 and floor plate 115. Three cover plates (not shown) are attachable to the top plate 113, back plate 114 and floor plate 115 illustrated in FIG. 1 to completely enclose the automatic magnetic tape cartridge stack loader apparatus contained in the housing. FIG. 7 illustrates the completely assembled housing including a plurality of magnetic tape cartridges 701 inserted into stack load slot 100. The housing and its included apparatus is placed in front of a tape drive 702. The tape drive has an access port into which a magnetic tape cartridge can be placed by an operator or by the automatic magnetic tape cartridge stack loader apparatus. Back plate 114 has an opening therein that matches the size, shape and position of the access port of the associated tape drive 702. Back plate 114 is placed in juxtaposed position with the front of the tape drive 702 such that the automatic magnetic tape cartridge stack loader apparatus can load a magnetic tape cartridge through the opening in back plate 114 into the access port of the tape drive 702 as is described below.

STACK LOAD APPARATUS OVERVIEW

The automatic magnetic tape cartridge stack load apparatus includes a stack load slot 100 into which a plurality of magnetic tape cartridges can be inserted in a single operation. The stack load slot 100 is bounded on two sides by stack grab plates 101, 102. These plates 101, 102 are moveable in the horizontal direction (illustrated by arrow C) to come into contact with the stack of magnetic tape cartridges loaded in stack load slot 100 and to securely hold the stack of magnetic tape cartridges in a clamping operation. Drop mechanism 103 is located below stack grab plates 101, 102 and serves to provide a bottom portion to the stack load slot Drop mechanism 103 consists of a pair of moveable angular shaped fingers which, when in the closed position, provide a lip or shelf on the lower right hand and lower left hand portions of stack load slot 100. This shelf provides support for the bottom of the stack of magnetic tape cartridges that are inserted into magnetic tape stack load slot 100. The two fingers of drop mechanism 103 are operated to be moved in the downward direction (illustrated by arrow A), then in the outward direction (illustrated by arrow C) where they swing apart a sufficient distance so that a magnetic tape cartridge from the bottom of the stack in magnetic tape cartridge stack load slot 100 down can be deposited onto tray mechanism 104, located below drop mechanism 103.

DROP MECHANISM

Figure 2:
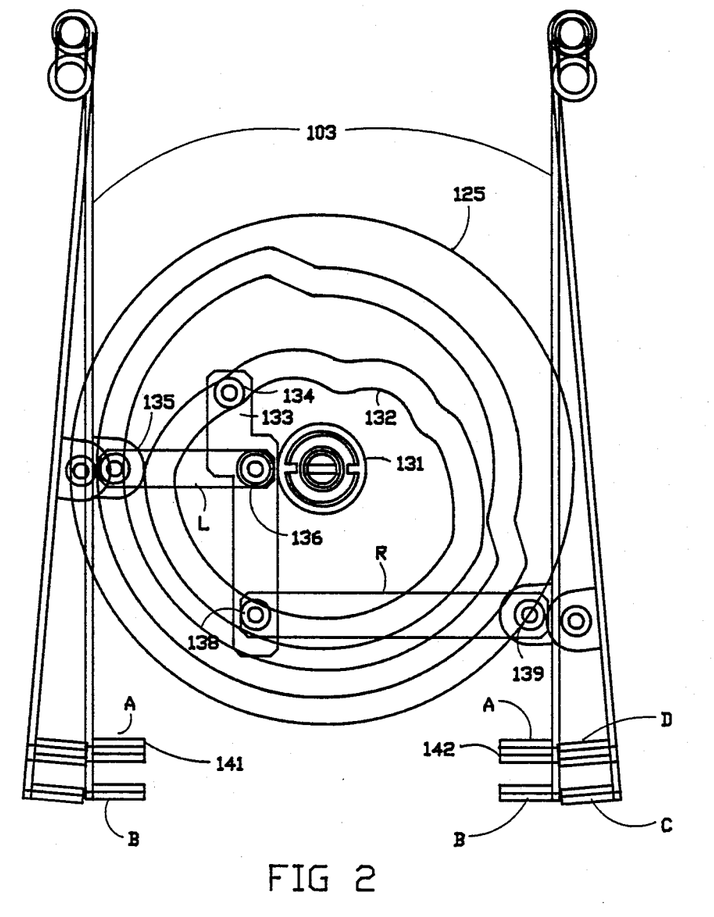
FIGS. 2 and 3 illustrate the automatic magnetic tape cartridge stack loader mechanism driving cam and magnetic tape cartridge load, insertion and unload apparatus.

In operation, stack grab plates 101, 102 are maintained in the extended position where they do not come in close contact with magnetic tape cartridges loaded in magnetic tape cartridge stack load slot 100. Drop mechanism 103 is maintained in the closed position to thereby provide support for the bottom of the stack of magnetic tape cartridges in stack load slot 100 to prevent the magnetic tape cartridges loaded therein from dropping below. Thus, an operator loads a plurality of magnetic tape cartridges into the stack load slot 100, which magnetic tape cartridges are to be sequentially loaded into the associated tape drive. To load a magnetic tape cartridge into the tape drive, motor 123 is activated to rotate worm shaft 124 which engages and turns cam 125. FIG. 2 illustrates a front view of cam 125 and drop mechanism 103 as viewed in direction B shown on FIG. 1. The initial position of drop mechanism 103 is as shown in FIG. 1 where the shelf or fingers of drop mechanism 103 are located at the bottom of stack grab plates 101, 102. This position corresponds to the position noted by "A" in FIG. 2.

As motor 123 turns cam 125, the vertical and horizontal positions of drop mechanism 103 are changed. Cam 125 rotates about pivot point 131. Cam 125 includes a plurality of tracks such as 132. Crank 133 includes a follower 134 that is positioned in track 132. Levers L and R are also each connected at one end to crank 133 by pivots 136 and 138 respectively. Levers L and R are connected at their respective other ends to the left side and right side of drop mechanism 103 by pivots 135 and 139 respectively. As cam 125 rotates about pivot point 131, follower 134 moves along track 132. The combined motion of follower 134 along with the shape of crank 133 causes drop mechanism 103 to translate in vertical and horizontal directions. Drop mechanism 103 first moves from position A to position B in a downward vertical direction. Load mechanism 104 also has angular shaped fingers at its top end to provide a shelf that has notches 117 cut into it. These notches 117 provide openings into which the fingers of drop mechanism 103 fit when drop mechanism 103 is translated into position B by cam 125. Thus, the bottommost magnetic tape cartridge in the stack located in stack loader slot 100 is supported by the shelf of load mechanism 104 rather than the shelf of drop mechanism 103 when drop mechanism 103 is in position B.

Figure 3:
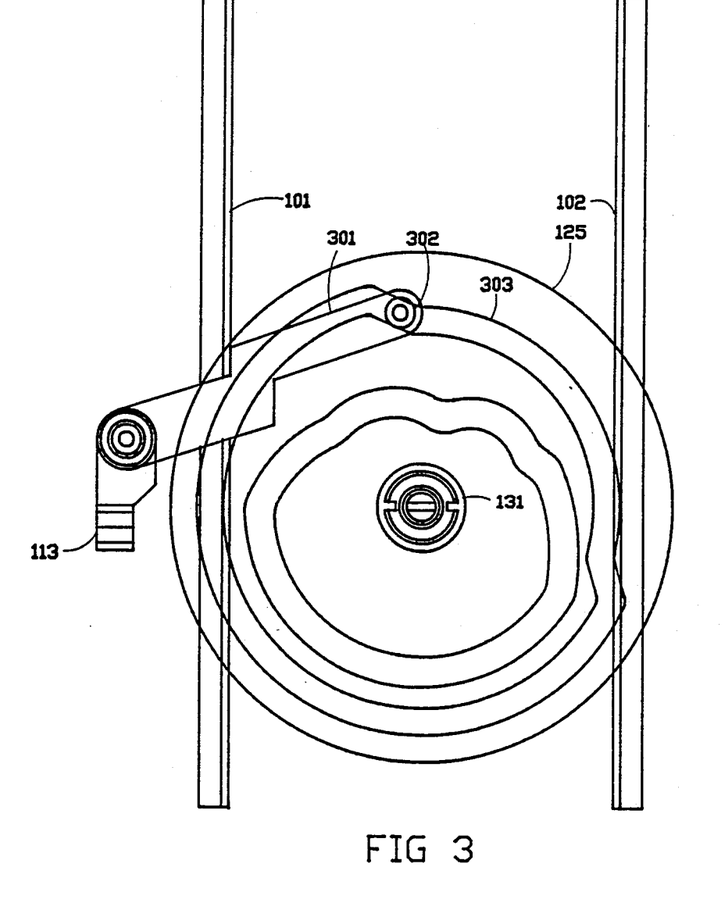

Stack grab plates 101, 102 are operated by cam 125 concurrently with drop mechanism 103. FIG. 3 illustrates the mechanism to activate stack grab plates 101, 102. A second track 303 on cam 125 is used to clamp the sides of the stack of magnetic tape cartridges in stack load slot 100 as the stack is being displaced in a downward direction by drop mechanism 103. Crank 301 is activated by follower 302 in track 303 to cause clamp lever 118 to engage stack grab plate 101 to translate stack grab plate 101 toward stack grab plate 102, thereby clamping the sides of the stack of magnetic tape cartridges in stack load slot 100. The stack is clamped such that stack grab plates 101, 102 clamp all of the magnetic tape cartridges in the stack except the bottom most magnetic tape cartridge. In addition, the timing of the operation of stack grab plates 101, 102 is coordinated with the operation of drop mechanism 103 such that the stack is clamped before drop mechanism 103 completes its downward motion. Therefore, when drop mechanism 103 reaches position B of FIG. 2, there is a gap between the top of the magnetic tape cartridge now resting on the shelf of load mechanism 104 and the bottom of the bottom most magnetic tape cartridge in the stack.

Stack grab plates 101 and 102 securely hold the stack of magnetic tape cartridges with the exception of the bottom most magnetic tape cartridge so that the remaining stack of magnetic tape cartridges cannot move. Once cam 125 operates stack grab plates 101, 102 to securely and firmly grasp the stack of magnetic tape cartridges in magnetic tape cartridge stack load slot 100, cam 125 operates drop mechanism 103 to move in the outward direction out from under the bottom of the bottom most magnetic tape cartridge in the magnetic tape cartridge stack. Once drop mechanism 103 has been rotated a sufficient distance outward to position C of FIG. 2, it no longer provides vertical support to the bottom most magnetic tape cartridge. This magnetic tape cartridge is supported only by the shelf of load mechanism 104 which is in the closed or supporting position. Cam 125 continues to rotate and operates drop mechanism 103 in the reverse direction to move vertically to position D and then to come together and close under the bottom of the remaining magnetic tape cartridge stack into position A, the starting position or closed position. Once drop mechanism 103 is in the closed position, cam 125 operates stack grab plates 101, 102 to move outwardly to release the magnetic tape cartridge stack. The magnetic tape cartridges in the stack are now again supported by the closed drop mechanism 103. Thus, stack grab plates 101, 102 drop mechanism 103 and load mechanism 104 operate as described above to deposit the magnetic tape cartridge that is on the bottom of the stack into position in front of the access port of the associated tape drive 702 to be loaded therein.

TRACTOR MECHANISM

The magnetic tape cartridge, located on the shelf of load mechanism 104, is placed into the access port of the associated tape drive by the operation of a tractor mechanism 126 (FIG. 4) that is part of the automatic magnetic tape cartridge stack loader apparatus. This tractor mechanism 126 consists of a drive belt 105 which is pivoted into position (FIG. 5) by the cranks and pivots 501-508 of the tractor mechanism 126 to come into contact with one side of the magnetic tape cartridge that has been deposited on the shelf of load mechanism 104. Drive belt 105 is thereby clamped against one side of the magnetic tape cartridge while the other side of the magnetic tape cartridge rests against a friction plate 509 that has a low coefficient of friction and is located on the opposite side of the magnetic tape cartridge. Drive belt 105 is operated by a motor 131 to rotate in a counterclockwise direction as viewed from above to slide the magnetic tape cartridge from the shelf of load mechanism 104 through the opening in back plate 114 into the access port of the corresponding tape drive.

Figure 4:
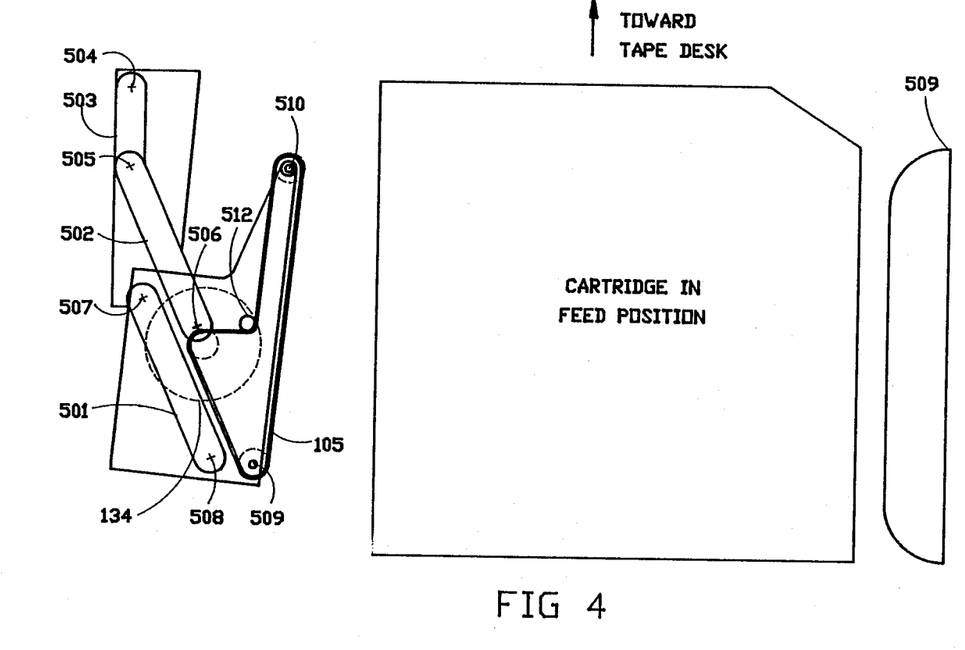
FIGS. 4 through 6 the automatic magnetic tape cartridge stack loader mechanism magnetic tape cartridge insertion apparatus.
Figure 5:
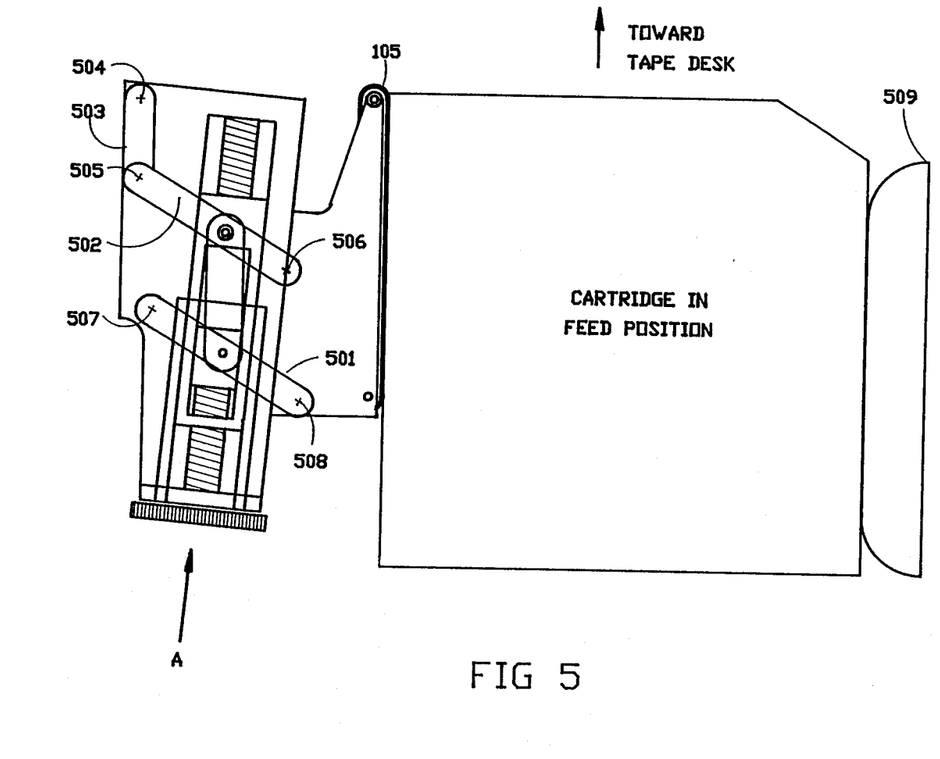

Tractor mechanism 126 includes drive belt 105 which is driven by drive gear 511 of motor 131 to follow a path around pulleys 509, 510, 512. Drive belt 105 slides the magnetic tape cartridge into and out of the access port of the associated tape drive 702, depending on the direction of rotation of motor 131. The tractor mechanism is pivoted into position by the operation of cranks 501-503 and pivots 504-508. FIG. 4 illustrates the position of cranks 501-503 when tractor mechanism 126 is in the retracted position. Motor 129 drives gear 130 which turns threaded screw 601 to reposition cranks 501-503. This is accomplished by the rotation of threaded screw 601 translating nut 602, which is attached to spring 106 in direction A. The spring 106 is compressed by nut 602 and exerts a force on frame 108 of tractor mechanism 126, causing cranks 501-503 to pivot and reposition drive belt 105 into position against one side of the magnetic tape cartridge. Motor 129 keeps rotating until drive belt 105 is positioned against the side of the magnetic tape cartridge and spring 106 is also compressed.

Figure 6:
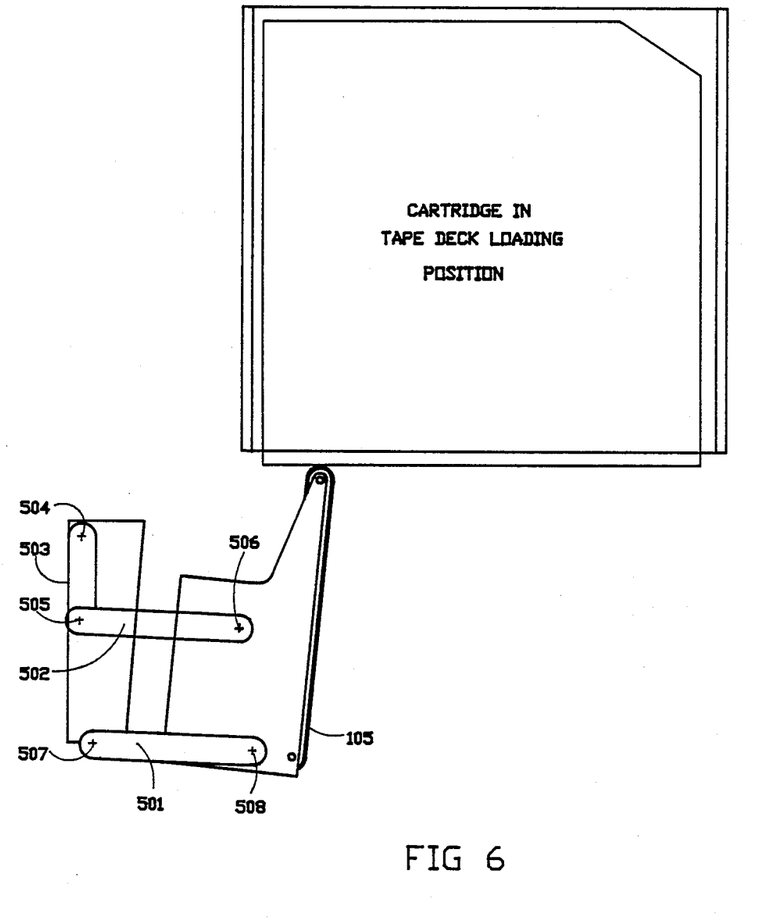

In order to insure that the magnetic tape cartridge is properly seated in the tape drive, tractor mechanism 126 also acts as a kicker mechanism (FIG. 6) to push the back of the magnetic tape cartridge so that the magnetic tape cartridge is inserted all the way into the tape drive. The kicker operation is implemented when drive belt 105 slides the magnetic tape cartridge into the associated tape drive 702. Once the magnetic tape cartridge clears the end of tractor mechanism 126, spring 106 further operate cranks 501–503 and pivots 504–508 to swing drive belt 105 out into the opening behind the magnetic tape cartridge that has been inserted most of the way into the tape drive slot by drive belt 105. Thus, tractor mechanism 126 drive belt 105 is positioned behind the magnetic tape cartridge so that the end of drive belt 105 presses against the outwardly facing end of the magnetic tape cartridge. Tractor mechanism 126 continues its rotation due to spring 106 so that the end of drive belt 105 pushes the magnetic tape cartridge into the associated tape drive 702.

MAGNETIC CARTRIDGE EJECT

Once the tape drive has completed the read or write of data on this magnetic tape cartridge, the tape drive ejects the spent magnetic tape cartridge out onto load mechanism 104. A reverse sequence of operations now takes place to unload the magnetic tape cartridge from the tape drive. Drive belt 105 is operated in the position shown in FIG. 5 in the clockwise direction to remove the magnetic tape cartridge from the tape drive and retrieve it all the way onto load mechanism 104. Once this has taken place, solenoid 127 operates load mechanism 104 to rotate its two fingers in the outward direction so that the magnetic tape cartridge resting on the top of load mechanism 104 is placed into the spent cartridge retrieval mechanism. The spent cartridge retrieval mechanism consists of a slot 111 that has two sides 110 in a fixed position so that the slot 111 is slightly wider than a magnetic tape cartridge. An elevator mechanism 112 is provided to move in a vertical direction (A) such that the elevator mechanism 112 is located immediately below load mechanism 104 so that the magnetic tape cartridge is placed on to elevator mechanism 112 once load mechanism 104 operates in the outwardly direction. Elevator mechanism 112 is positioned a sufficient distance below the bottom of load mechanism 104 so that the spent magnetic tape cartridge can rest on the top of elevator mechanism 112 and not interfere with the operation of load mechanism 104. With each new magnetic tape cartridge that is ejected from the tape drive and placed by load mechanism 104 onto the top of elevator 112 or the stack of magnetic tape cartridges resting on the top of elevator mechanism 112, motor 121 and power screw 128 reposition elevator mechanism 112 down one additional magnetic tape cartridge width below load mechanism 104 so that the subsequent ejected magnetic tape cartridge placed on the top of the existing stack of magnetic tape cartridges supported by elevator mechanism 112 clears load mechanism 104.

Thus, it can be seen that this apparatus enables an operator to load an entire stack of magnetic tape cartridges into the magnetic tape cartridge stack load slot 100. No individual placement of magnetic tape cartridges is required and the slot can continuously be refilled at the operator's convenience to thereby maintain a continuous feed of magnetic tape cartridges into the associated tape drive. Similarly, the loader apparatus stacks ejected magnetic tape cartridges in a stack on the bottom portion of load mechanism 104 so that they can be retrieved by the operator, not on an individual basis, but as an entire stack. This stack loading and retrieval provides a more efficient operation than the individual loading of magnetic tape cartridges into an automatic loader apparatus.

One additional benefit of this apparatus is that it can be operated in a bidirectional fashion. Thus, the ejected magnetic tape cartridge that is top most on the stack of ejected magnetic tape cartridges on top of elevator mechanism 112 can be reloaded into the associated tape drive. This accomplished by solenoid 127 operating load mechanism 104 so that its fingers are in the outward direction. Elevator mechanism 112 is moved vertically to bring the upper most magnetic tape cartridge in the stack of ejected tape cartridges in position in front of the opening in the associated tape drive. Load mechanism 104 is then operated to close so that its fingers slide under the bottom of the top most magnetic tape cartridge in the ejected tape cartridge stack. The magnetic tape cartridge so repositioned is now ready to be loaded into the associated tape drive as described above where the magnetic tape cartridges that are dropped from above from the magnetic tape cartridge stack load slot 100. Thus, the last written or read magnetic tape cartridge can be reloaded into the tape drive for further reading or writing of data thereon.

While a specific embodiment of the invention has been disclosed, it is expect that those skilled in the art can and will implement variations of the preferred embodiment disclosed therein, which variations still fall within the scope of the appended claims.

I claim:

1. Automatic magnetic tape cartridge loading apparatus comprising:
    means for loading a magnetic tape cartridge into an associated tape drive;
    means located in juxtaposed position above said loading means for receiving a plurality of magnetic tape cartridges placed in a vertically oriented stack by a user including:
    two walls, each located on opposite sides of said stack of magnetic tape cartridges, at least one of said walls being operable to come into contact with the associated side of said stack of magnetic tape cartridges, means for moving said at least one wall for holding said stack of magnetic tape cartridges, less the bottommost magnetic tape cartridge, in a fixed vertical position;
    means for retaining said bottommost magnetic tape cartridge in said vertically oriented stack above said loading means;
    wherein said retaining means is operable to deposit said bottommost magnetic tape cartridge into said loading means for insertion into said associated tape drive.

2. The apparatus of claim 1 further including:
    means located in juxtaposed position below said loading means for receiving magnetic tape cartridges ejected by said associated tape drive.

3. The apparatus of claim 2 wherein said loading means includes;
    means for supporting magnetic tape cartridges deposited in said loading means by said retaining means and ejected from said associated tape drive.

4. The apparatus of claim 3 wherein said supporting means is operable to place said ejected magnetic tape cartridge into said receiving means.

5. The apparatus of claim 4 wherein said receiving means includes:
   means responsive to the ejection of a magnetic tape cartridge by said associated tape drive for moving the stack of previously ejected magnetic tape cartridges down a predetermined distance below said loading means to receive the presently ejected magnetic tape cartridge.

6. The apparatus of claim 3 wherein said loading means further includes:
   means for transporting a magnetic tape cartridge deposited in said supporting means by said retaining means into said associated tape drive.

7. The apparatus of claim 6 wherein said loading means further includes:
   means responsive to said transporting means loading said magnetic tape cartridge into said associated tape drive for pushing said magnetic tape cartridge into said associated tape drive to firmly seat said magnetic tape cartridge therein.

8. The apparatus of claim 6 wherein said transporting means is responsive to said associated tape drive ejecting a magnetic tape cartridge for transporting said ejected magnetic tape cartridge into said supporting means.

9. The apparatus of claim 3 wherein said supporting means comprises a pair of parallel rails positioned below said deposited magnetic tape cartridge to support said deposited magnetic tape cartridge along either edge of said deposited magnetic tape cartridge and movable in an outward direction away from said edges of said deposited magnetic tape cartridge to deposit said magnetic tape cartridge into said receiving means.

10. The apparatus of claim 9 wherein said transporting means includes:
    guide means located above and to one side of said supporting means for guiding one side of said magnetic tape cartridge as it is transported into said associated tape drive;
    belt means located above and to the other side of said supporting means for frictionally engaging the other side of said magnetic tape cartridge and operable to slide said magnetic tape cartridge along said parallel rails into said associated tape drive.

11. The apparatus of claim 1 wherein said supporting means comprises a pair of parallel rails positioned below said bottommost magnetic tape cartridges to support said bottommost magnetic tape cartridge along either edge of said bottommost magnetic tape cartridge and movable in an outward direction away from said edges of said bottommost magnetic tape cartridge to place said bottommost magnetic tape cartridge into said receiving means.

12. Automatic magnetic tape cartridge loading apparatus comprising:
    means for loading a magnetic tape cartridge into an associated tape drive;
    means located in juxtaposed position above said loading means for receiving a plurality of magnetic tape cartridges placed in a vertically oriented stack by a user and operable to deposit the bottommost magnetic tape cartridge of said stack into said loading means for insertion into said associated tape drive including:
    two walls, each located on opposite sides of said stack of magnetic tape cartridges, at least one of said walls being operable to come into contact with the associated side of said stack of magnetic tape cartridges, means for moving said at least one wall for holding said stack of magnetic tape cartridges, less the bottommost magnetic tape cartridge, in a fixed vertical position.

13. The apparatus of claim 12 further including:
    means located in juxtaposed position below said loading means for receiving magnetic tape cartridges ejected by said associated tape drive.

14. The apparatus of claim 13 wherein said loading means includes:
    means for supporting magnetic tape cartridges deposited in said loading means by said receiving means and ejected from said associated tape drive.

15. The apparatus of claim 14 wherein said supporting means is operable to place said ejected magnetic tape cartridge into said receiving means.

16. The apparatus of claim 15 wherein said receiving means includes:
    means responsive to the ejection of a magnetic tape cartridge by said associated tape drive for moving the stack of previously ejected magnetic tape cartridges down a predetermined distance below said loading means when said receiving means receives the presently ejected magnetic tape cartridge.

17. The apparatus of claim 14 wherein said loading means further includes:
    means for transporting a magnetic tape cartridge deposited in said supporting means by said retaining means into said associated tape drive.

18. The apparatus of claim 17 wherein said loading means includes:
    means responsive to said transporting means loading said magnetic tape cartridge into said associated tape drive for pushing said magnetic tape cartridge into said associated tape drive to firmly seat said magnetic tape cartridge therein.

19. The apparatus of claim 17 wherein said transporting means is responsive to said associated tape drive ejecting a magnetic tape cartridge for transporting said ejected magnetic tape cartridge into said supporting means.

20. The apparatus of claim 17 wherein said supporting means comprises a pair of parallel rails positioned below said deposited magnetic tape cartridge to support said magnetic tape cartridge along either edge of said magnetic tape cartridge and movable in an outward direction away from said edge of said magnetic tape cartridge to deposit said magnetic tape cartridge into said receiving means.

21. The apparatus of claim 21 wherein said transporting means includes:
    guide means located above and to one side of said supporting means for guiding one side of said magnetic tape cartridge as it is transported into said associated tape drive;
    belt means located above and to the other side of said supporting means for frictionally engaging the other side of said magnetic tape cartridge and operable to slide said magnetic tape cartridge along said parallel rails into said associated tape drive.

22. The apparatus of claim 14 wherein said supporting means comprises a pair of parallel rails positioned below said deposited magnetic tape cartridge to support said bottommost magnetic tape cartridge along either edge of said bottommost magnetic tape cartridge and movable in an outward direction away from said edge of said magnetic tape cartridge to place said bottommost magnetic tape cartridge into said receiving means.

23. The apparatus of claim 14 wherein said receiving means further includes:
  means for retaining said bottommost magnetic tape cartridge in said vertically oriented stack above said loading means;
  wherein said retaining means is operable to deposit said bottommost magnetic tape cartridge into said loading means for insertion into said associated tape drive.

* * * * *